United States Patent
Tsukiyama et al.

(10) Patent No.: US 8,866,094 B2
(45) Date of Patent: Oct. 21, 2014

(54) RADIATION DETECTOR

(75) Inventors: Akira Tsukiyama, Hino (JP); Takuto Sakumura, Hachioji (JP); Yuji Tsuji, Hamura (JP); Pawel Grybos, Rzaska (PL); Piotr Maj, Bilgoraj (PL); Robert Szczygiel, Cracow (PL)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 13/813,711

(22) PCT Filed: Dec. 9, 2010
(Under 37 CFR 1.47)

(86) PCT No.: PCT/JP2010/072167
§ 371 (c)(1),
(2), (4) Date: Apr. 4, 2013

(87) PCT Pub. No.: WO2012/077218
PCT Pub. Date: Jun. 14, 2012

(65) Prior Publication Data
US 2014/0203182 A1    Jul. 24, 2014

(51) Int. Cl.
*G01T 1/24* (2006.01)

(52) U.S. Cl.
CPC .................................... *G01T 1/247* (2013.01)
USPC .................................... 250/370.08

(58) Field of Classification Search
CPC ............ H04N 5/32; H04N 5/378; G01T 1/00; G01T 1/17; G01T 1/171; G01T 7/005
USPC .................................... 250/370.08
See application file for complete search history.

(56) References Cited

U.S. PATENT DOCUMENTS

| | | | |
|---|---|---|---|
| 5,004,904 | A | 4/1991 | Yamakawa et al. |
| 7,514,688 | B2 | 4/2009 | Broennimann et al. |
| 7,829,860 | B2 | 11/2010 | Nygard et al. |
| 7,868,665 | B2 | 1/2011 | Tumer et al. |
| 2004/0017224 | A1 | 1/2004 | Tumer et al. |
| 2004/0051063 | A1 * | 3/2004 | Shoji .............................. 250/580 |
| 2004/0223583 | A1 * | 11/2004 | Tsujii .............................. 378/19 |
| 2008/0099689 | A1 | 5/2008 | Nygard et al. |
| 2010/0149391 | A1 * | 6/2010 | Kameshima et al. ......... 348/300 |
| 2013/0044248 | A1 | 2/2013 | Tumer et al. |

FOREIGN PATENT DOCUMENTS

| | | |
|---|---|---|
| JP | 58-187883 A | 11/1983 |
| JP | 58-187884 A | 11/1983 |
| JP | 64-80842 A | 3/1989 |
| JP | 2-66488 A | 3/1990 |
| JP | 3-25387 A | 2/1991 |

OTHER PUBLICATIONS

International Search Report issued in PCT/JP2010/072167, dated Jan. 25, 2011.

* cited by examiner

*Primary Examiner* — Marcus Taningco
(74) *Attorney, Agent, or Firm* — Birch, Stewart, Kolasch & Birch, LLP (57) ABSTRACT

There is provided a radiation detector that appropriately corrects an offset within a minute read cell without increasing area while achieving high-speed measurement at a high counting rate. A radiation detector 100 having a plurality of single-photon-counting imaging cells includes, for each imaging cell, a photodiode 3 which is applied with a reverse bias voltage and generates a current signal in response to incidence of radiation, a previous-stage DA converter d1 configured to correct an input signal based on the current signal generated by the photodiode 3, an amplifier k2 configured to amplify the signal corrected by the previous-stage DA converter d1, a subsequent-stage DA converter d2 configured to correct a charge signal amplified by the amplifier k2, a wave height discriminator 9 configured to discriminate output signals based on the signal corrected by the subsequent-stage DA converter d2, and a counter 10 configured to count the discriminated signals.

7 Claims, 6 Drawing Sheets

RADIATION DETECTOR

TECHNICAL FIELD

The present invention relates to a radiation detector having a plurality of single-photon-counting imaging cells.

BACKGROUND ART (Single-Photon-Counting System of Radiation)

A single-photon-counting detector of radiation includes a number of pixels and performs counting inside thereof. Such a detector is used by reading the result of counting for exposure for a fixed period of time. In particular, it can be thought to apply a detector supposed to have adaptation to highly intense radiation at a high counting rate, in addition to the minute pixel size, to high-speed imaging, specimen observation in a brief time, an analysis method, etc.

The detector as described above has imaging cells sensitive to radiation. Then, the signal from a read cell connected to the imaging cell is digitized by the single-photon-counting system. The count number that is digitized is further read by a reading device placed outside.

The signal (charge) from the imaging cell becomes a digital signal in accordance with the level of radiation energy by a wave height discriminator circuit through a charge amplifier circuit and a waveform shaping amplifier circuit. Then, the digital signal is counted by a counter circuit including a shift register. In the detector, together with the imaging cells, read cells including these circuits are arranged in the form of a matrix.

(Performance of High-Speed Measurement)

When an attempt is made to implement high-speed measurement with such a detector, it is necessary to omit wasteful time and to record incident photons by a counter circuit. In this case, the outputs from the charge amplifier circuit and the waveform shaping amplifier circuit are input to the wave height discriminator circuit as pulses. However, the temporal width of this pulse, that is, the response time of these circuits is wasteful. It is possible to implement high-speed performance by shortening the response time.

(Offset Voltage)

On the other hand, in the circuit with the configuration described above, it is known that there exists an offset voltage to the input signal in each of the charge amplifier circuit, the waveform shaping amplifier circuit, and the wave height discriminator circuit. That is, even when the input becomes zero, the output does not become zero. Further, a bias voltage is applied when the imaging cell sensitive to X-rays is used, however, there exists a leaked current (DC current) in the output. If the leaked current is input to the charge amplifier circuit as it is, the amplifier circuit itself is biased by the current as a result, forming another cause to generate the above-described offset voltage. The values of these offset voltages differ in magnitude between different imaging cells, and therefore, if an imaging device is configured in this state, the position where the signal appears, which corresponds to the incident photon of the X-ray input, differs from one another for each read cell and it is not possible to correctly form an image.

(AC Coupling)

Figure 5:
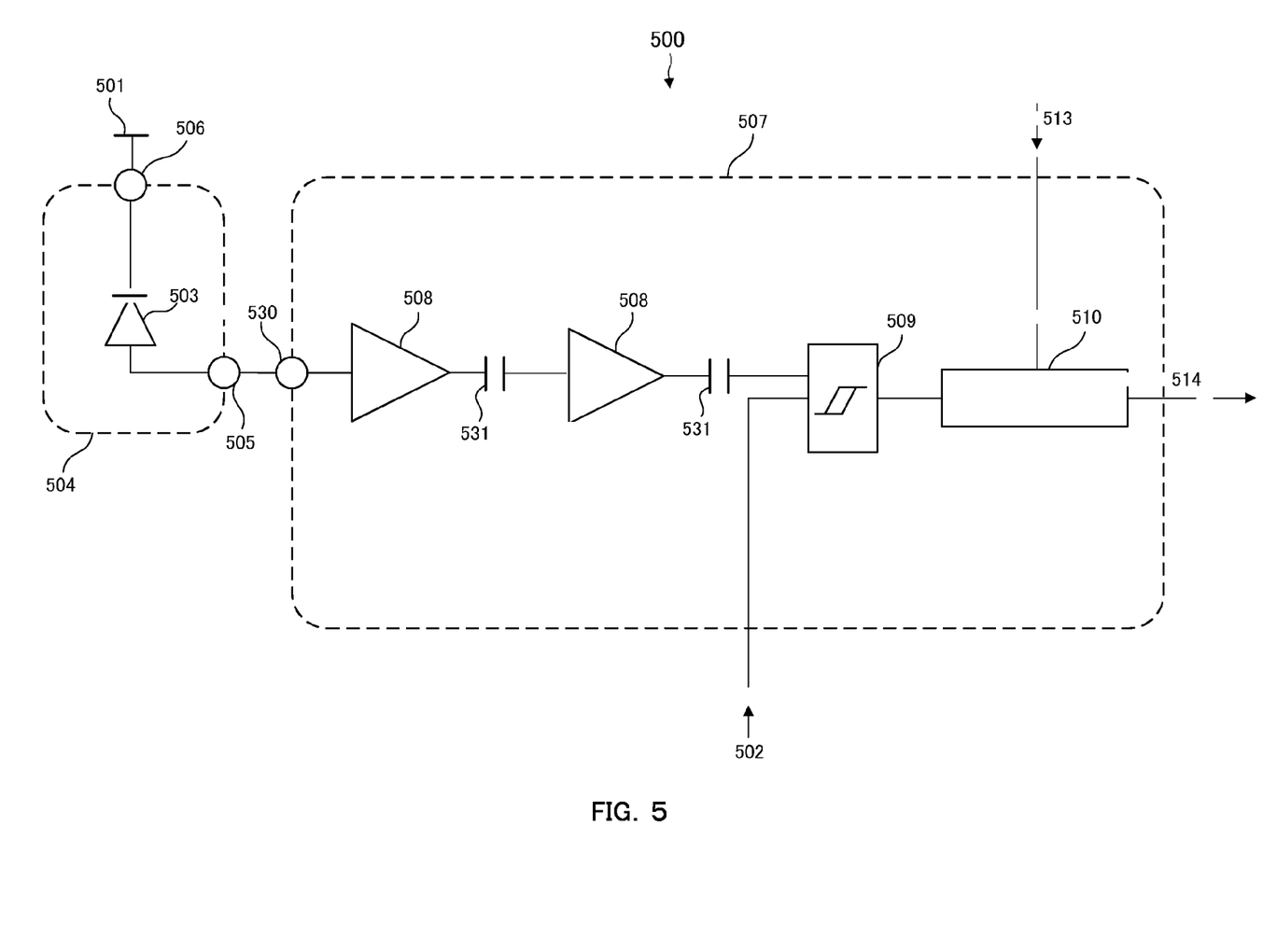
FIG. 5 is a diagram showing a circuit configuration of a radiation detector by conventional AC coupling.

As one method to avoid this, a capacitor is inserted in the previous stage of the charge amplifier circuit and at the input and output of the waveform shaping amplifier circuit to cut the DC component of the leaked current. FIG. 5 is a diagram showing a circuit configuration of a radiation detector 500 by the conventional AC coupling. The circuit system as shown in FIG. 5 is called the AC coupling.

As shown in FIG. 5, the radiation detector 500 includes a bias potential supply source 501, a threshold voltage supply source 502, an imaging cell 504, a read cell 507, a feeding unit 513 configured to read a counter circuit, and a signal line 514 connected from the counter circuit to outside. The imaging cell 504 includes a photodiode 503, an output terminal 505 from the photodiode, and a connection point 506 for the bias potential. To the photodiode 503, a reverse bias voltage is applied by the bias potential supply source 501 and a current signal is generated in response to the incidence of radiation. The read cell 507 includes an amplifier circuit 508, a capacitor 531, a wave height discriminator circuit 509, a counter circuit 510, an input terminal 530, and the signal line 514. FIG. 5 shows only a circuit corresponding to one of the plurality of imaging cells (this also applies to the following drawings).

The pulse signal having passed through the capacitor 531 by the AC coupling tends to overshoot at the time of rise and undershoot at the time of fall. In the AC coupling, the next pulse signal cannot be received while the pulse is passing therethrough. Further, even in the state where undershoot has occurred, if the next pulse signal overlaps, the wave height value changes, and therefore, it is not preferable to receive the pulse signal. That is, in the AC coupling, it is not possible to narrow the interval between pulse signals beyond a certain limit. That is, the high-speed pulse signal processing becomes difficult, and therefore, in order to implement high-speed measurement as a challenge, it is not preferable to adopt the AC coupling.

(DC Coupling)

Figure 6:
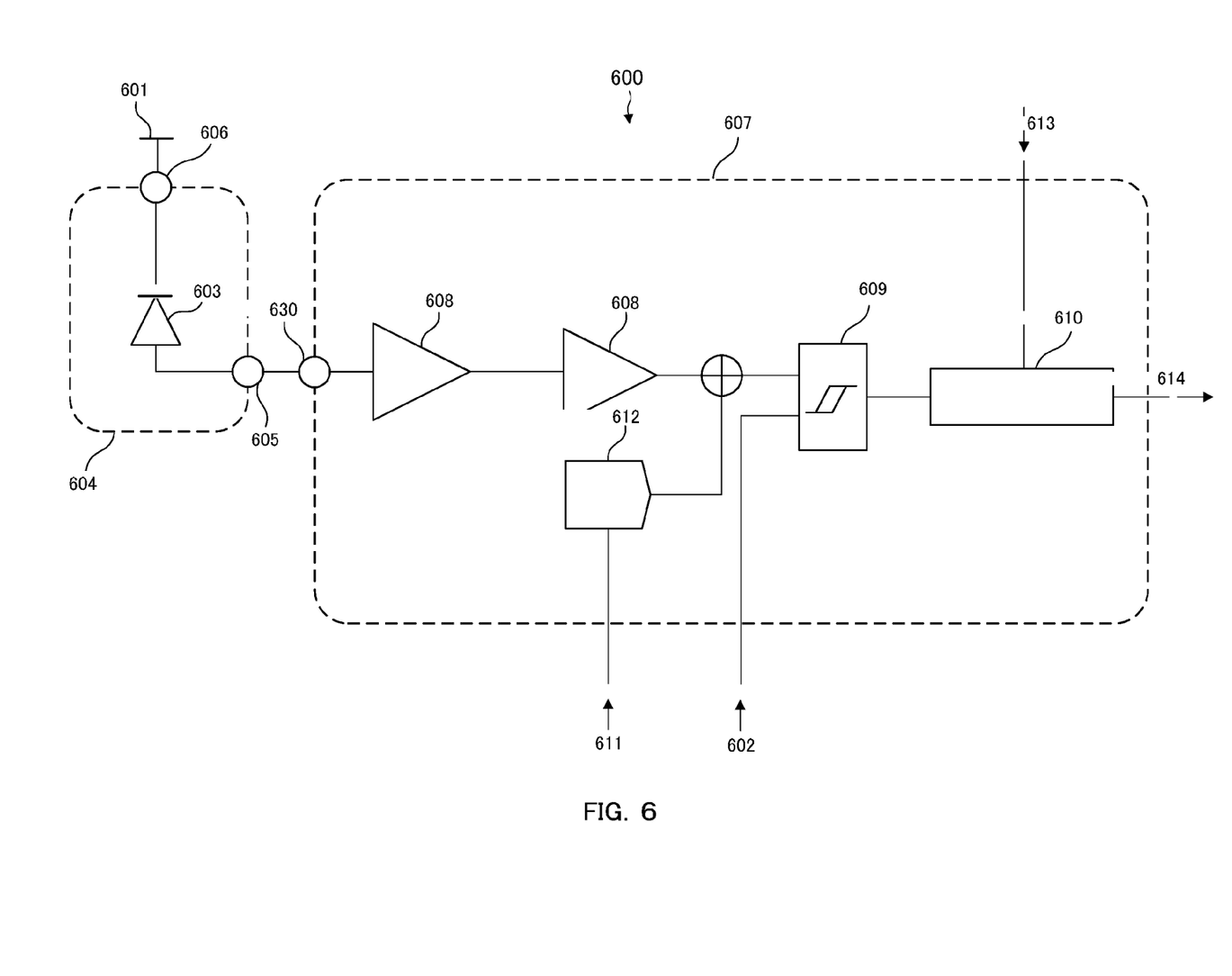
FIG. 6 is a diagram showing a circuit configuration of a radiation detector by conventional DC coupling.

On the other hand, a configuration in which a capacity is not inserted in each stage and each stage is connected directly is called the DC coupling. FIG. 6 is a diagram showing a circuit configuration of a radiation detector 600 by the conventional DC coupling. For the above-described reason, when high-speed performance is aimed at, it is preferable to adopt the DC coupling for connection, to place a DA converter 612 that can be set individually from outside within each read cell, and to make an attempt to cancel out the offset value by performing analog addition of the output thereof and the output of the waveform shaping amplifier circuit (amplifier 608 in the subsequent stage).

As shown in FIG. 6, the radiation detector 600 includes a bias potential supply source 601, a threshold voltage supply source 602, an imaging cell 604, a read cell 607, a setting unit 611 to a DA converter, a feeding unit 613 configured to read a counter circuit, and a signal line 614 connected from the counter circuit to outside. The imaging cell 604 includes a photodiode 603, an output terminal 605 from the photodiode, and a connection point 606 for the bias potential. To the photodiode 603, a reverse bias voltage is applied by the bias potential supply source 601 and a current signal is generated in response to the incidence of radiation. The read cell 607 includes the amplifier circuit 608, a DA converter 612, a wave height discriminator circuit 609, a counter circuit 610, an input terminal 630, and the signal line 614.

Patent Document 1 describes an example of a circuit of the DC coupling as described above. As shown in FIG. 4 of Patent Document 1, in order to implement adaptation to a high counting rate, the output from CS AMP is connected directly to CA COMP inside of ANALOG BLOCK. The output of CS AMP has an offset value having a value different for each different read unit cell and in order to cancel out this, THRESHOLD CORRECTOR is attached to the other input of CA COMP.

Patent Document 1: U.S. Pat. No. 7,514,688

DISCLOSURE OF THE INVENTION

However, with the system described in Patent Document 1, in addition to the leaked current from the photo detection cell, the amount of offset AMP itself has is applied to the signal and is further doubled. Consequently, the offset value when input to CA COMP is a large value and it becomes necessary to increase the variable range of THRESHOLD CORRECTOR to cancel out the offset value. The need to cover the variable range causes restrictions on manufacture of a small read unit cell.

The DA converter in the detector adopting the DC coupling system includes constant current sources in proportion to the weighting of bits set inside thereof and an arbitrary analog output is obtained by switching the current sources in accordance with the setting and by performing addition. For example, in a 4-bit DA converter, constant current sources (transistors) the ratio of areas of which is 1:2:4:8 are switched in accordance with the setting and addition is performed. As will be obvious from this, when the setting range is extended by an amount corresponding to 1 bit, it becomes necessary to add a constant current source having an area equal to the sum of the areas of all the currently-existing transistors. Consequently, the area that the constant current sources occupy is increased, resulting in an obstacle to implementation of a minute read cell.

The present invention has been made in view of such circumstances and an object thereof is to provide a radiation detector that appropriately corrects an offset within a minute read cell without increasing the area of the circuit part while implementing high-speed measurement at a high counting rate.

(1) In order to achieve the above-mentioned object, the radiation detector according to the present invention is a radiation detector having a plurality of single-photon-counting imaging cells, including, for each imaging cell: a photodiode which is applied with a reverse bias voltage and generates a current signal in response to incidence of radiation; a previous-stage DA converter configured to correct an input signal based on the current signal generated by the photodiode; an amplifier configured to amplify the signal corrected by the previous-stage DA converter; a subsequent-stage DA converter configured to correct a charge signal amplified by the amplifier; a wave height discriminator configured to discriminate output signals based on the signal corrected by the subsequent-stage DA converter; and a counter configured to count the discriminated signals. As described above, it is possible for the radiation detector according to the present invention to efficiently correct a signal in a small read cell by amplifying a corrected signal and further correcting the amplified signal.

(2) Further, the radiation detector according to the present invention is characterized in that, for each imaging cell, the corrected value by the previous-stage DA converter and the corrected value by the subsequent-stage DA converter are determined for the amplification factor of the amplifier so that the signal corrected by the subsequent-stage DA converter corresponds to the correction adjusted in advance between the imaging cells. As described above, correction adjusted in advance between imaging cells is performed, and therefore, accurate measurement is enabled in a plurality of the imaging cells.

(3) Further, the radiation detector according to the present invention is characterized in that the wave height discriminator allows only a signal of radiation detector having energy in a predetermined range to pass. Due to this, more effective discrimination is enabled for the wavelength of radiation.

(4) Further, the radiation detector according to the present invention is characterized by further including a charge amplifier circuit provided in a stage prior to the previous-stage DA converter and in that the amplifier is a waveform shaping amplifier. Due to this, it is possible to correct a signal efficiently in a small read cell without increasing the number of stages of the amplifier circuit.

(5) Further, the radiation detector according to the present invention is characterized in that the amplifier includes a current amplifier circuit and each of the DA converters is of current output type. Due to this, it is possible to correct a signal effectively despite the restrictions on the size of the read cell.

(6) Further, the radiation detector according to the present invention is a radiation detector having a plurality of single-photon-counting imaging cells and characterized by comprising, for each imaging cell, a photodiode which is applied with a reverse bias voltage and generates a current signal in response to incidence of radiation, an (n−1)-th DA converter configured to correct an input signal based on the current signal generated by the photodiode, an n-th amplifier configured to amplify the signal corrected by the (n−1)-th DA converter, an n-th DA converter configured to correct a charge signal amplified by the n-th amplifier, a wave height discriminator configured to discriminate output signals based on the signal corrected by the n-th DA converter, and a counter configured to count the discriminated signals, wherein the (n−1)-th DA converter, the n-th amplifier, and the n-th DA converter are connected in series in the number from two to an integer N of two or more consecutively as to the integer n. As described above, the radiation detector of the present invention has a configuration in which a corrected signal is amplified and further corrected, and therefore, it is possible to correct a signal efficiently in a read cell that requires a high amplification degree.

(7) Further, the radiation detector according to the present invention is characterized in that, for each imaging cell, the corrected value by the (n−1)-th DA converter and the corrected value by the n-th DA converter are determined for the amplification factor of the n-th amplifier so that the signal corrected by the N-th DA converter corresponds to the correction adjusted in advance between the imaging cells. As described above, correction adjusted in advance between the imaging cells is performed, and therefore, accurate measurement is enabled in a plurality of imaging cells.

According to the present invention, it is possible to correct an offset appropriately within a minute read cell without increasing the area the circuit portion occupies while implementing high-speed measurement at a high counting rate.

BEST MODES FOR CARRYING OUT THE INVENTION

Next, embodiments of the present invention are explained with reference to the drawings. In order to facilitate understanding of the explanation, in each drawing, the same reference numeral is attached to the same component and duplicated explanation is omitted.

First Embodiment

Circuit Configuration

Figure 1:
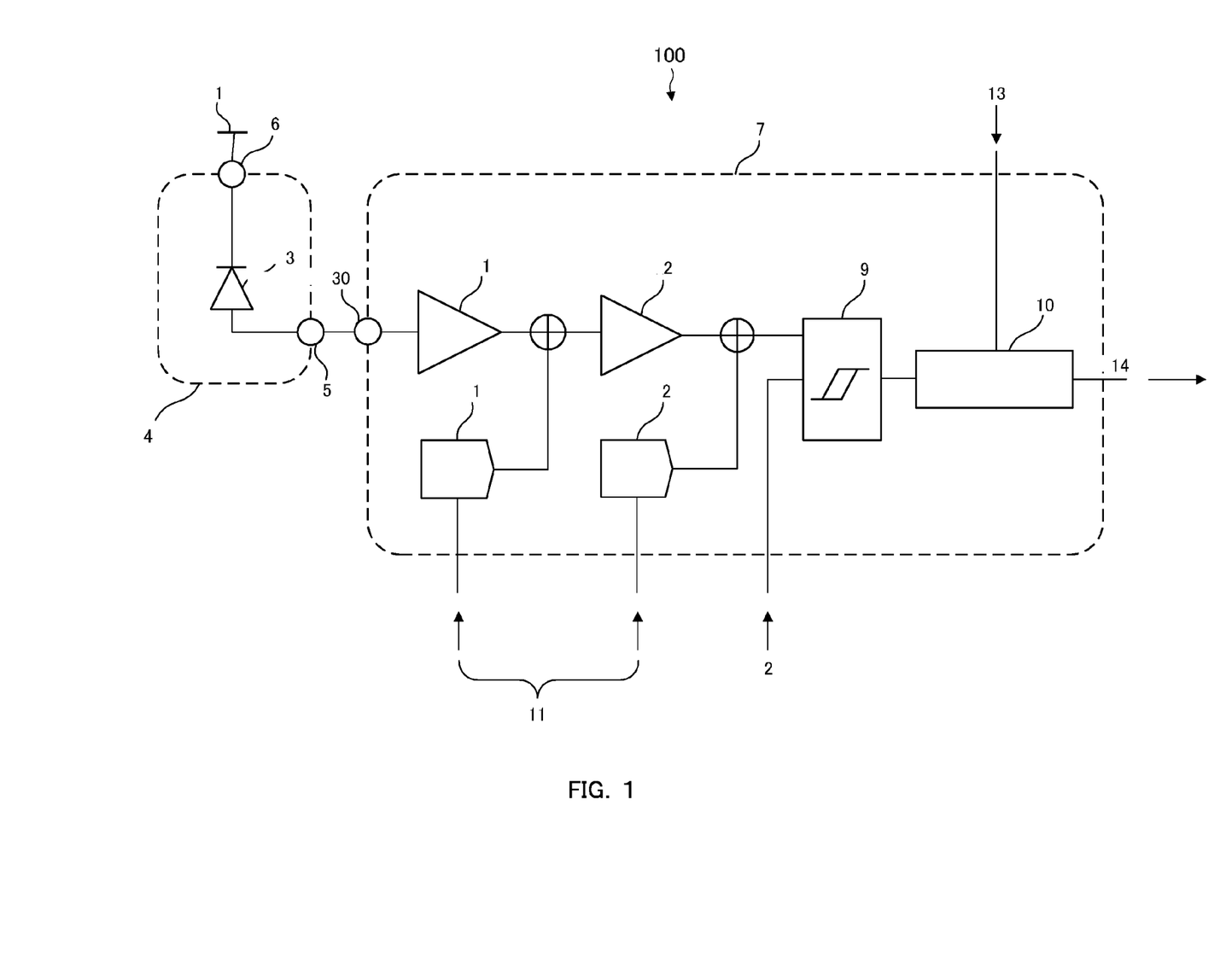
FIG. 1 is a diagram showing a circuit configuration of a radiation detector of a first embodiment.

FIG. 1 is a diagram showing a circuit configuration of a radiation detector 100. The radiation detector 100 has a plurality of single-photon-counting imaging cells 4. However, FIG. 1 shows only the circuit configuration of the single imaging cell 4. Radiation to be detected includes at least X-rays and y-rays. It is possible to apply the radiation detector 100 to imaging using X-rays and a detecting unit for an analysis method, such as the X-ray diffraction method.

It is preferable for the radiation detector 100 to include a minute and high-density read cell. Thereby, it is possible to implement adaptation to highly intense (at a high counting rate) incident radiation while including the discrimination capacity for the energy of incident radiation.

The radiation detector 100 adopts the DC coupling system for the connection in the amplification stage to implement high-speed performance. Further, the amplifier circuit is divided into a plurality of stages and a correction DA converter to cancel out an offset is provided at the output of each of the stages and thus an offset voltage is corrected. Due to this, it is possible to correct the influence of a leaked current from a detection element while implementing high-speed performance without increasing the area of the circuit part. Details of the circuit configuration are described later.

In order to implement high-speed performance, the DC coupling system is adopted for the connection in the amplification stage and further, the amplifier circuit is divided into a plurality of stages, a correction DA converter to cancel out an offset is provided at the output of each of the stages, and an offset voltage is corrected. Due to this, it is possible to correct the influence of the offset while implementing high-speed performance with a smaller area of the circuit part.

As shown in FIG. 1, the radiation detector 100 includes a bias potential supply source 1, a threshold voltage supply source 2, the imaging cell 4, a read cell 7, a setting unit 11 to a DA converter, a feeding unit 13 configured to read a counter 10, and a signal line 14 connected from the counter 10 to outside.

The imaging cell 4 includes a photodiode 3, an output terminal 5 of the photodiode 3, and a connection point 6 for the bias potential. To the photodiode 3, a reverse bias voltage is applied from the bias potential supply source 1 and the photodiode 3 generates a current signal in response to the incidence of radiation. The signal by the radiation incident on the photodiode 3 is input to amplifier circuits k1 and k2 within the read cell 7. The amplifier circuits k1 and k2 are divided into two stages. The configuration is such that to the output side of each of the amplifier circuits k1 and k2, two DA converters d1 and d2 for the purpose of offset correction are connected and the outputs are subjected to analog addition.

As described above, by dividing offset correction by performing the offset correction before and after the amplifier, it is possible to cover a large correction range efficiently.

The read cell 7 includes the previous-stage amplifier circuit k1, the subsequent-stage amplifier circuit k2, the previous-stage DA converter d1, the subsequent-stage DA converter d2, a wave height discriminator 9, the counter 10, an input terminal 30, and the signal line 14. The input terminal 30 is an input terminal of the read cell 7.

The previous-stage amplifier k1 amplifies the current signal generated by the photodiode 3. It is preferable for the previous-stage amplifier k1 to be a charge amplifier circuit. The previous-stage DA converter d1 corrects an input signal that is amplified based on the current signal generated by the photodiode 3. The subsequent-stage amplifier k2 amplifies the signal corrected by the previous-stage DA converter d1. It is preferable for the subsequent-stage amplifier k2 to be a waveform shaping amplifier circuit. Due to this, it is possible to correct a signal efficiently in a small read cell without increasing the number of stages of the amplifier.

In a single-photon-counting detection circuit, a charge amplifier circuit is installed and a waveform shaping amplifier circuit is installed in the subsequent stage thereof. It is preferable to use a charge amplifier circuit as the previous-stage amplifier in the above-described embodiment and to use a waveform shaping amplifier circuit as the subsequent-stage amplifier. In that case, a correction circuit by a DA converter is installed at each output. An appropriate value is given to the amplification degree of the charge amplifier circuit and to that of the waveform shaping amplifier circuit, respectively.

The subsequent-stage DA converter d2 corrects the charge signal amplified by the subsequent-stage amplifier k2. By amplifying and further correcting the corrected signal, it is possible to correct the signal efficiently in a small read cell.

For each imaging cell, the corrected value by the previous-stage DA converter d1 and the corrected value by the subsequent-stage DA converter d2 are determined for the amplification factor of the subsequent-stage amplifier k2 so that the signal corrected by the subsequent-stage DA converter d2 corresponds to the correction adjusted in advance between imaging cells. Due to this, accurate measurement is enabled in a plurality of imaging cells. The amplifier may be configured by a current amplifier circuit and each DA converter may be of current output type. Due to this, it is possible to correct a signal effectively under restrictions on the size of the read cell. It is possible to determine the corrected value by, for example, making an inspection while exposing the radiation detector 100 to the same X-rays for a fixed period of time. At this time, the corrected value is determined so that the same count is observed for the same energy by counting while slightly changing the setting of the wave height discriminator 9 for each imaging cell with exposure being kept.

It is preferable for the DA converter to be of current output type. The circuit configuration of the DA converter of current output type is simple, and therefore, it is suitable when configuring the circuit part in a particularly minute read cell. In that case, by using the amplifiers k1 and k2 themselves also as current amplifier circuits, it is possible to perform analog addition at the outputs of the amplifiers k1 and k2 without providing a current/voltage converter on the way.

The signal line 14 is connected from the counter 10 to outside and transmits a signal. The wave height discriminator 9 discriminates output signals based on the signal corrected by the subsequent-stage DA converter d2. The counter 10 counts the discriminated signals.

(Correction Circuit)

Figure 2A:
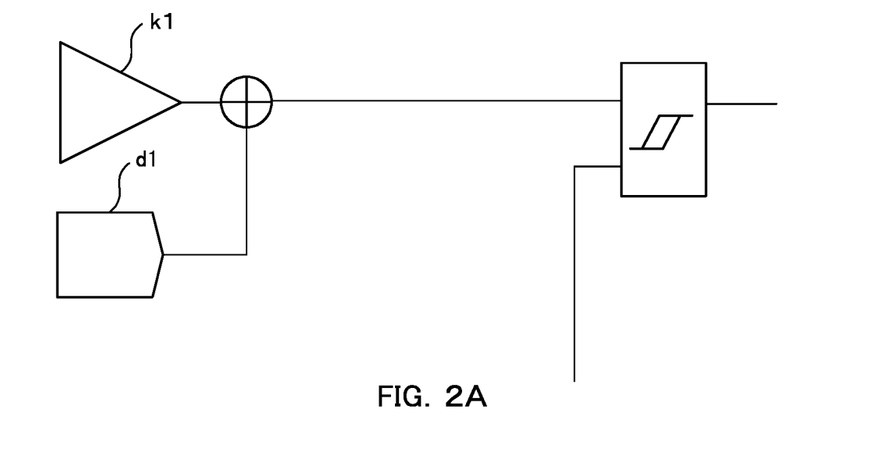
FIG. 2A is a diagram showing an example of a correction circuit of a radiation detector in a comparative example and FIG. 2B is a diagram showing an example of a correction circuit of a radiation detector in the embodiment.

FIG. 2A is a diagram showing an example of a correction circuit of a radiation detector in a comparative example. FIG.

Figure 2B:
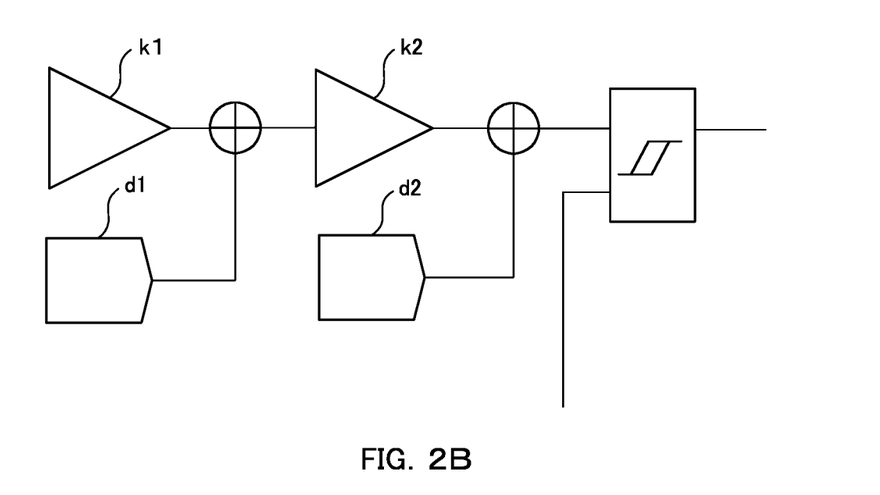

2B is a diagram showing an example of a correction circuit of a radiation detector in the embodiment. First, the example of the circuit shown in FIG. 2A includes the amplifier k1 and the DA converter d1 but does not include the subsequent-stage amplifier and the number of stages of the amplifier k1 is one. The gain of the amplifier k1 is 100 and to the amplifier an offset voltage Voff is input.

On the output side of the amplifier k1, the DA converter d1 is provided and the DA converter d1 corrects the offset voltage Voff with a voltage step Vd. A case is considered where the voltage step Vd is equal to the offset voltage Voff. The gain of the amplifier k1 is 100, and therefore, the offset voltage at the output of the amplifier is amplified to Voff×100.

At this time, in order for the DA converter d1 to cancel out the amplified offset voltage, the DA converter d1 is required to have resolution capable of covering the range of Vd×100. This corresponds to $100<128=2^7$ in terms of bits, and therefore, the resolution that the DA converter d1 is required to have is 7 bits. However, the maximum setting of the DA converter d1 is 127, and thus, [maximum correction voltage of DA converter]=Vd×127. As described above, the number of bits of the DA converter d1 is required so that [offset voltage at the output of the amplifier k1]<[maximum correction voltage of the DA converter d1] holds.

The example of the circuit shown in FIG. 2B includes the amplifier k1, the DA converter d1, the amplifier k2, and the DA converter d2 and correction is applied to the circuit of the read cell in two divided stages. Both the previous-stage amplifier k1 and the subsequent-stage amplifier k2 have an amplification gain of one or more.

The amplifier is divided into two stages and the gain of the previous-stage amplifier k1 is 25 and the gain of the subsequent-stage amplifier k2 is 4. Consequently, the gain of the whole of the coupled circuits is 25×4=100, the same gain as that in the example of FIG. 2A. To the amplifier k1, the voltage Voff is input as an offset.

Further, the DA converters d1 and d2 are provided on the output sides of the amplifiers k1 and k2, respectively, and correct the offset voltage Voff. A case is considered where the voltage step of both the DA converters d1 and d2 is also Vd and the voltage step Vd is equal to the offset voltage Voff. In this case, the DA converter d1 is required to have resolution capable of covering the range of Vd×25. This corresponds to $25<32=2^5$ in terms of bits, and therefore, the resolution that the DA converter d1 is required to have is 5 bits. However, the maximum setting of the DA converter d1 is 31, and therefore, [maximum correction voltage of the DA converter]=Vd×31 holds. As described above, the number of bits of the DA converter d1 becomes necessary so that [offset voltage at the output of the amplifier k1]<[maximum correction voltage of the DA converter d1] holds.

The resolution of the DA converter required at the output of the subsequent-stage amplifier k2 is considered on the assumption that the largest Voff remains although the offset voltage after correction at the output of the previous-stage amplifier k1 is unlikely to exceed Voff. In this case, Voff×4 is the largest offset voltage at the output of the subsequent-stage amplifier k2. Consequently, the DA converter d2 is required to have resolution capable of covering the range of Vd×4. This corresponds to $4<8=2^3$ in terms of bits, and therefore, the resolution that the DA converter d1 is required to have is 3 bits. However, the maximum setting of the DA converter d2 is seven, and therefore, [maximum correction voltage of the DA converter]=Vd×7 holds. As described above, the number of bits of the DA converter d2 becomes necessary so that [offset voltage at the output of the amplifier k2]<[maximum correction voltage of the DA converter d2] holds.

As the number of bits of the resolution of the DA converter increases, the area that the DA converter occupies increases. Consequently, as in the radiation detector 100, when there is a request for a circuit configuration within a minute area, it is more advantageous to use both the 5-bit DA converter and the 3-bit DA converter than to use the 7-bit DA converter alone.

In a comparison of the areas of the constituent parts, the number of bits that are handled is the same, and therefore, the constituent parts other than the first constant current source can be regarded to have substantially the same area, but, on the other hand, the area units of the constant current source are proportional to the resolution and in the case of 7 bits, the area units are 127 units while in the case of 5 bits and 3 bits, the area units are 31 units and 7 units, respectively, and therefore, the total number of bits of both is a quarter or less of that in the case of 7 bits. It is possible to select appropriate values for the resolution of the DA converter, the number of stages of amplifier, and the weighting for the amplification degree of amplifier by taking into consideration the circuit system to be adopted, the semiconductor process characteristic, etc.

Second Embodiment

Figure 3:
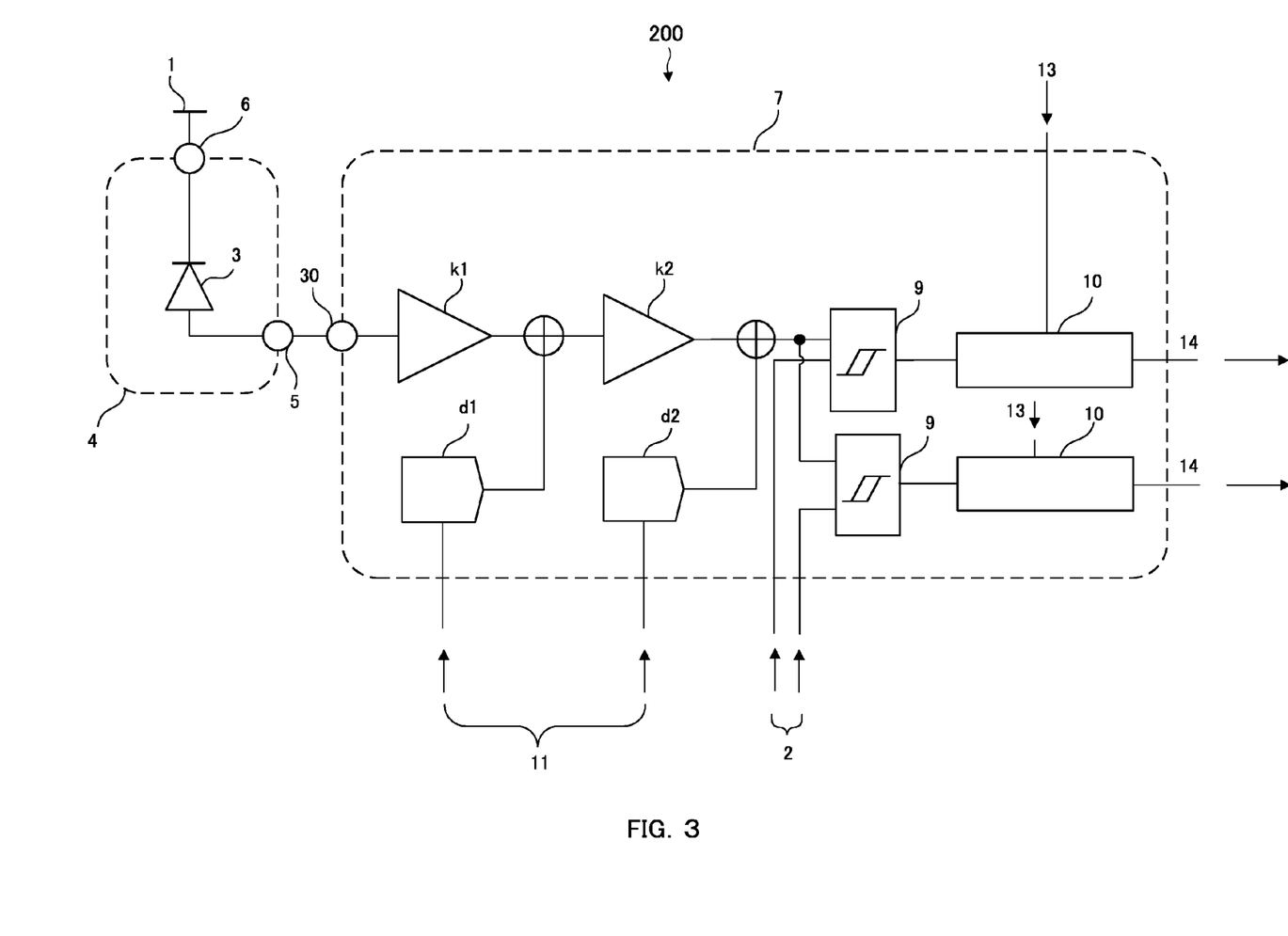
FIG. 3 is a diagram showing a circuit configuration of a radiation detector of a second embodiment.

In the above-described embodiment, one set of the wave height discriminator circuit and the counter is provided after the amplifier but two sets may be provided. FIG. 3 is a diagram showing a circuit configuration of a radiation detector 200 when there are two sets of the wave height discriminator circuit and the counter. The wave height discriminator circuit 9 allows only a signal of radiation having energy in a predetermined range to pass. Due to this, more effective discrimination is enabled for the wavelength of radiation.

In the radiation detector 200, two sets of the wave height discriminator 9 and the counter 10 are provided after the amplifier. By providing two sets of the wave height discriminator circuit as described above, it is possible to sensitively discriminate the difference in height of the wave height (energy, wavelength of incident X-ray).

It may also be possible to use the two wave height discriminators 9 in this case to simultaneously count the photons by the two kinds of incident radiation different in energy level (wavelength). Further, it may also be possible to pay attention to the incident X-ray at a specific energy level (wavelength) and to form a window comparator configured to discriminate only the incident X-ray. In either case, the amount of offset voltage between the different read cells 7 is corrected more sufficiently, and therefore, a use method is enabled, which makes use of sensitivity to the energy level.

Third Embodiment

Multi-Stage Type

Figure 4:
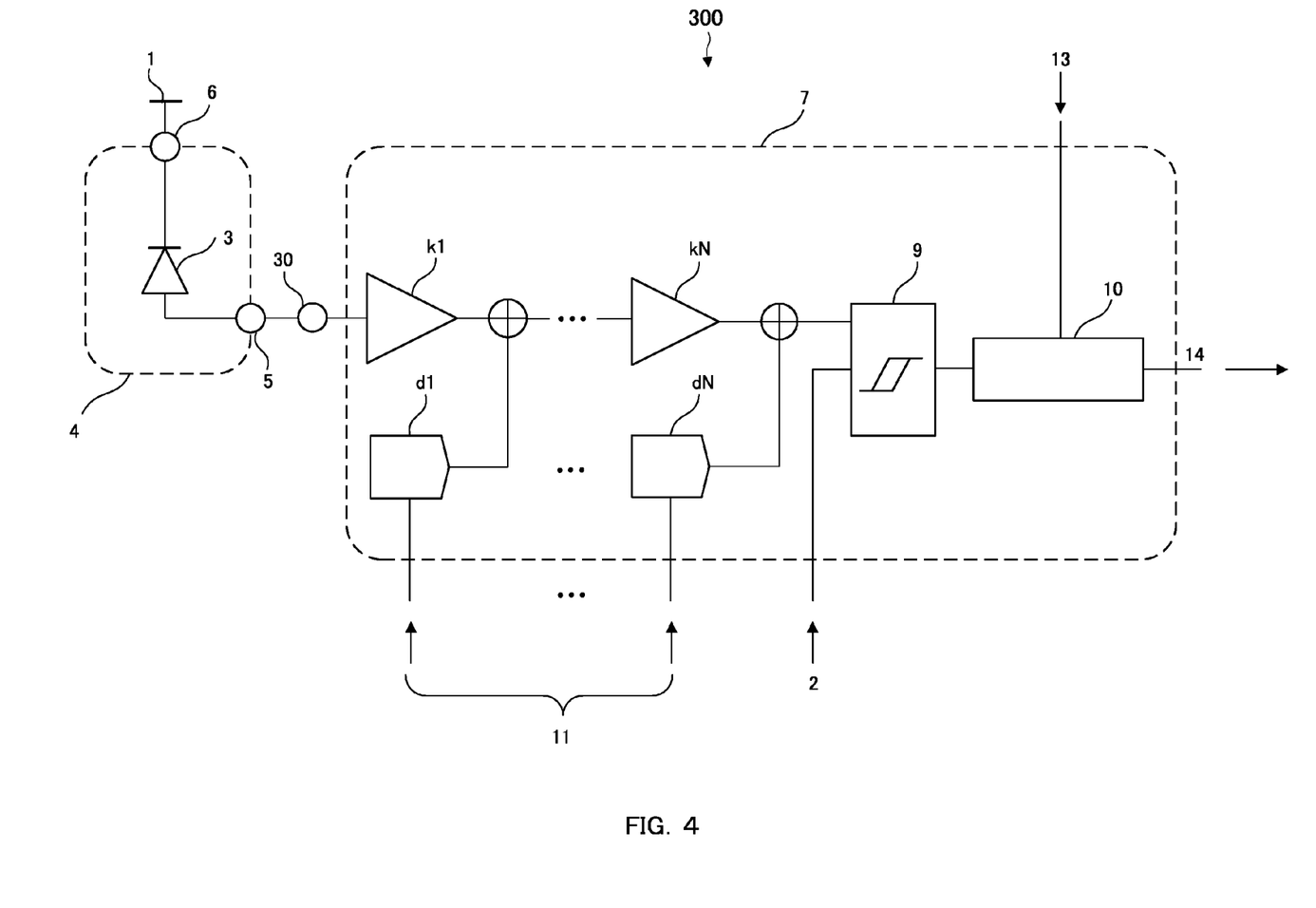
FIG. 4 is a diagram showing a circuit configuration of a radiation detector of a third embodiment.

In the above-described embodiments, the configuration is such that the previous-stage DA converter d1 and the subsequent-stage DA converter d2 are provided and correction is performed in two stages, but, correction may be performed in multiple stages. FIG. 4 is a diagram showing a circuit configuration of a multi-stage radiation detector 300. In this case, the correction circuit includes the first amplifier k1 to N-th amplifier kN and the first DA converter d1 to N-th DA converter dN.

The (n−1)-th DA converter dn−1 corrects an input signal based on the current signal generated by the photodiode. As to the integer n, the n-th amplifier kn amplifies the signal corrected by the (n−1)-th DA converter. The n-th DA converter corrects the charge signal amplified by the n-th amplifier.

As described above, the (n−1)-th DA converter dn−1, the n-th amplifier kn, and the n-th DA converter dn are connected in series in the number from two to the integer N of two or more consecutively as to the integer n. Because of the configuration as described above in which the corrected signal is amplified and is further corrected, it is possible to correct a signal efficiently in a small read cell. When N=2, the circuit is the same as that in the first embodiment.

The wave height discriminator 9 discriminates output signals based on the signal corrected by the N-th DA converter dN. The counter 10 counts the discriminated signals. For each imaging cell, the corrected value by the (n−1)-th DA converter dn−1 and the corrected value by the n-th DA converter dn are determined for the amplification factor of the n-th amplifier so that the signal corrected by the N-th DA converter dN corresponds to the correction adjusted in advance between imaging cells. As described above, correction adjusted in advance between the imaging cells is performed, and therefore, accurate measurement is enabled in a plurality of imaging cells.

DESCRIPTION OF SYMBOLS 1 bias potential supply source
2 threshold voltage supply source
3 photodiode
4 imaging cell
5 output terminal
6 connection point
7 read cell
9 wave height discriminator circuit
10 counter
11 setting unit
12 DA converter
13 feeding unit
14 signal line
30 input terminal
k1 previous-stage amplifier
k2 subsequent-stage amplifier
d1 previous-stage DA converter
d2 subsequent-stage DA converter
kn n-th amplifier
dn n-th DA converter
100, 200, 300 radiation detector

The invention claimed is:

1. A radiation detector having a plurality of single-photon-counting imaging cells, comprising, for each imaging cell:
   a photodiode which is applied with a reverse bias voltage and generates a current signal in response to incidence of radiation;
   a previous-stage DA converter configured to correct an input signal based on the current signal generated by the photodiode;
   an amplifier configured to amplify the signal corrected by the previous-stage DA converter;
   a subsequent-stage DA converter configured to correct a charge signal amplified by the amplifier;
   a wave height discriminator configured to discriminate output signals based on the signal corrected by the subsequent-stage DA converter; and
   a counter configured to count the discriminated signals.

2. The radiation detector according to claim 1, wherein
   for each imaging cell, the corrected value by the previous-stage DA converter and the corrected value by the subsequent-stage DA converter are determined for the amplification factor of the amplifier so that the signal corrected by the subsequent-stage DA converter corresponds to the correction adjusted in advance between the imaging cells.

3. The radiation detector according to claim 1, wherein
   the wave height discriminator allows only a signal of radiation having energy in a predetermined range to pass.

4. The radiation detector according to claim 1, further comprising a charge amplifier circuit provided in a stage prior to the previous-stage DA converter, wherein
   the amplifier is a waveform shaping amplifier.

5. The radiation detector according to claim 1, wherein
   the amplifier includes a current amplifier circuit, and each of the DA converters is of current output type.

6. A radiation detector having a plurality of single-photon-counting imaging cells, comprising, for each imaging cell:
   a photodiode which is applied with a reverse bias voltage and generates a current signal in response to incidence of radiation;
   an (n−1)-th DA converter configured to correct an input signal based on the current signal generated by the photodiode;
   an n-th amplifier configured to amplify the signal corrected by the (n−1)-th DA converter;
   an n-th DA converter configured to correct a charge signal amplified by the n-th amplifier;
   a wave height discriminator configured to discriminate output signals based on the signal corrected by the n-th DA converter; and
   a counter configured to count the discriminated signals, wherein
   the (n−1)-th DA converter, the n-th amplifier, and the n-th DA converter are connected in series in the number from two to an integer N of two or more consecutively as to the integer n.

7. The radiation detector according to claim 6, wherein
   for each imaging cell, the corrected value by the (n−1)-th DA converter and the corrected value by the n-th DA converter are determined for the amplification factor of the n-th amplifier so that the signal corrected by the N-th DA converter corresponds to the correction adjusted in advance between the imaging cells.

* * * * *